US012598677B2

(12) United States Patent
Uno et al.

(10) Patent No.: US 12,598,677 B2
(45) Date of Patent: Apr. 7, 2026

(54) HIGH-FREQUENCY HEATING APPARATUS

(71) Applicant: Panasonic Intellectual Property Management Co., Ltd., Osaka (JP)

(72) Inventors: Takashi Uno, Shiga (JP); Daisuke Hosokawa, Shiga (JP); Fumitaka Ogasawara, Hyogo (JP); Koji Yoshino, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 932 days.

(21) Appl. No.: 17/294,410

(22) PCT Filed: Nov. 29, 2019

(86) PCT No.: PCT/JP2019/046697

§ 371 (c)(1),
(2) Date: May 16, 2021

(87) PCT Pub. No.: WO2020/111214

PCT Pub. Date: Jun. 4, 2020

(65) Prior Publication Data

US 2022/0022292 A1 Jan. 20, 2022

(30) Foreign Application Priority Data

Nov. 30, 2018 (JP) ................................ 2018-225570

(51) Int. Cl.
*H05B 6/68* (2006.01)
*H05B 6/50* (2006.01)
*H05B 6/54* (2006.01)

(52) U.S. Cl.
CPC ................ *H05B 6/68* (2013.01); *H05B 6/50* (2013.01); *H05B 6/54* (2013.01)

(58) Field of Classification Search
CPC ....... A23L 3/365; A23L 3/30; A23V 2002/00; H05B 6/50; H05B 6/52; H05B 6/54
See application file for complete search history.

(56) References Cited

U.S. PATENT DOCUMENTS 5,543,604 A * 8/1996 Taylor .............. B29C 66/91643 219/607
9,215,756 B2 * 12/2015 Bilchinsky .............. H05B 1/02
2017/0266870 A1 * 9/2017 Lepple-Wienhues .... H05B 6/62

FOREIGN PATENT DOCUMENTS

EP 3326433 A1 * 5/2018 .............. H05B 6/50
JP 2004-206938 7/2004
(Continued)

OTHER PUBLICATIONS

International Search Report of PCT application No. PCT/JP2019/046697 dated Jan. 28, 2020.

*Primary Examiner* — Steven W Crabb
*Assistant Examiner* — Spencer H. Kirkwood
(74) *Attorney, Agent, or Firm* — WENDEROTH, LIND & PONACK, L.L.P.

(57) ABSTRACT

A high-frequency heating apparatus according to the present disclosure includes a first electrode (11), a second electrode (12), a high-frequency power supply (30), a position adjuster (20), a detector (50), and a controller (60). The second electrode (12) is disposed facing the first electrode. The high-frequency power supply (30) supplies a high-frequency power to the first electrode. The position adjuster (20) adjusts a distance between the first electrode (11) and the second electrode (12). The detector (50) detects a reflected power from the first electrode (11) toward the high-frequency power supply (30). The controller (60) controls the position adjuster (20) based on the reflected power. In this embodiment, a heating target can be heated efficiently.

4 Claims, 8 Drawing Sheets

(56) References Cited

FOREIGN PATENT DOCUMENTS

| | | | | | | |
|---|---|---|---|---|---|---|
| JP | 2005-129335 | | | 5/2005 | | |
| JP | 2005-158326 | | | 6/2005 | | |
| JP | 2005158326 | A | * | 6/2005 | ............... | H05B 6/50 |
| JP | 2006-012547 | | | 1/2006 | | |
| WO | WO-2017164291 | A1 | * | 9/2017 | ............... | H05B 6/68 |

* cited by examiner

HIGH-FREQUENCY HEATING APPARATUS

TECHNICAL FIELD

The present disclosure relates to a high-frequency heating apparatus.

BACKGROUND ART

A defrosting apparatus disclosed in Patent Literature 1, for example, is known as a high-frequency heating apparatus. In the defrosting apparatus disclosed in Patent Literature 1, a heating target is disposed between opposing electrodes, and the heating target is heated by a high-frequency power supplied across the electrodes (for example, see Patent Literature 1).

The defrosting apparatus disclosed in Patent Literature 1 is furnished with two opposing electrodes, an adjusting mechanism, a high-frequency supplying section, and a condition-changing section. The adjusting mechanism adjusts the gap between the opposing electrodes. The high-frequency supplying section supplies a high-frequency power to the opposing electrodes. The condition-changing section changes a supply condition of the high-frequency power to the opposing electrodes based on the gap between the opposing electrodes.

The defrosting apparatus disclosed in Patent Literature 1 adjusts the gap between the opposing electrodes according to the height of an object to be defrosted, so that the heating target can be defrosted in a more appropriate condition regardless of the height of the heating target.

CITATION LIST

Patent Literature

PTL 1: Japanese Patent Unexamined Publication No. 2006-12547

SUMMARY

In the case of the apparatus disclosed in Patent Literature 1, the heating target is brought into contact with one of the electrodes, and thereafter, the other one of the electrodes is placed at a position that is a predetermined distance away from the heating target.

In such an apparatus, it is possible that the distance between the other electrode and the heating target may be kept constant. However, the impedance of the opposing electrodes including the heating target varies depending on the size and type of heating target. For this reason, the apparatus disclosed in Patent Literature 1 needs to adjust the high-frequency power to be supplied according to the positions of the electrodes. In this case, when the output power of the high-frequency power is reduced, the heating process time may be undesirably longer.

The impedance of the opposing electrodes can be adjusted using an impedance matcher. In this case, in order to deal with the variation of the impedance of the opposing electrodes, it is necessary to construct the impedance matcher using a variable reactance element that has a relatively wide variable range. In this case, it may take a long time to adjust a constant.

Thus, there still remains room for improvement in the apparatus disclosed in Patent Literature 1 from the viewpoint of heating the heating target efficiently. Moreover, the apparatus of such type requires a sensor for detecting contact between an electrode and a heating target and a mechanism for limiting the load acting on the heating target when the electrode comes into contact with the heating target. As a consequence, the configuration of the apparatus becomes complicated.

A high-frequency heating apparatus according to one aspect of the present disclosure includes a first electrode, a second electrode, a high-frequency power supply, a position adjuster, a detector, and a controller. The second electrode is disposed facing the first electrode. The high-frequency power supply supplies a high-frequency power to the first electrode. The position adjuster adjusts a distance between the first electrode and the second electrode. The detector detects a reflected power from the first electrode toward the high-frequency power supply. The controller controls the position adjuster based on the reflected power.

In this embodiment, a heating target can be heated efficiently.

DESCRIPTION OF EMBODIMENTS

Figure 1:
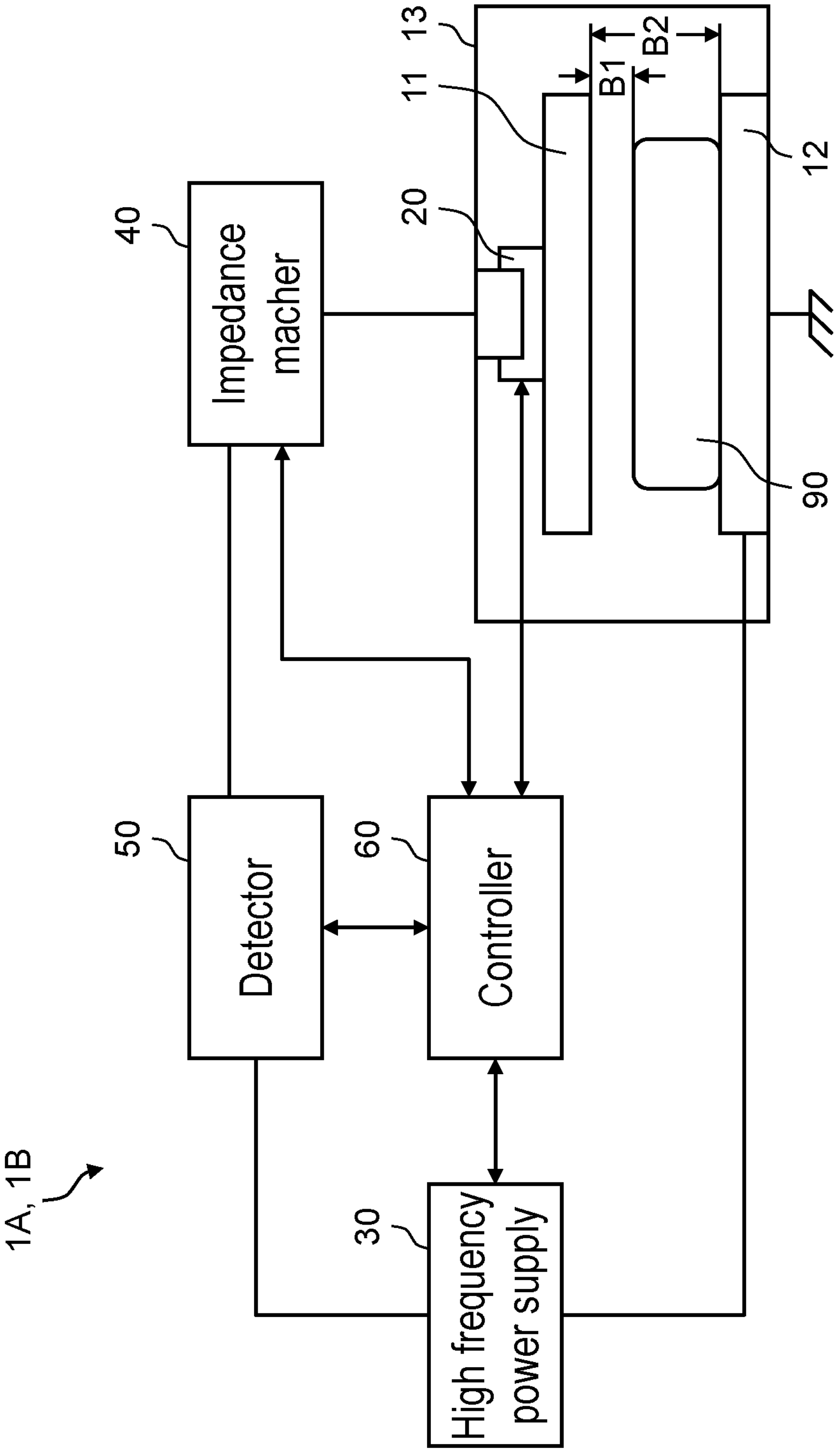
FIG. 1 is a schematic view illustrating the configuration of a high-frequency heating apparatus according to a first exemplary embodiment of the present disclosure.

A high-frequency heating apparatus according to a first aspect of the present disclosure includes a first electrode, a second electrode, a high-frequency power supply, a position adjuster, a detector, and a controller. The second electrode is disposed facing the first electrode. The high-frequency power supply supplies a high-frequency power to the first electrode. The position adjuster adjusts a distance between the first electrode and the second electrode. The detector detects a reflected power from the first electrode toward the high-frequency power supply. The controller controls the position adjuster based on the reflected power.

In a high-frequency heating apparatus according to a second aspect of the present disclosure, in addition to the first aspect, the position adjuster moves one or both of the first electrode and the second electrode. The controller causes the position adjuster to adjust the distance between the first electrode and the second electrode, thereby acquiring a value of the reflected power from the detector. The controller stop the position adjuster when the value corresponding to the reflected power is less than or equal to a predetermined first threshold value.

A high-frequency heating apparatus according to a third aspect of the present disclosure is further provided with, in addition to the first aspect, an impedance matcher disposed between the first electrode and the high-frequency power supply. After having adjusted the distance between the first electrode and the second electrode, the controller causes the impedance matcher to perform impedance matching between the high-frequency power supply and a load.

In a high-frequency heating apparatus according to a fourth aspect of the present disclosure, in addition to the second aspect, the controller determines that no heating target is not placed between the first electrode and the second electrode when the value corresponding to the reflected power is greater than the first threshold value before the distance between the first electrode and the second electrode reaches a predetermined second threshold value.

A high-frequency heating apparatus according to a fifth aspect of the present disclosure is further provided with, in addition to the first aspect, an impedance matcher disposed between the first electrode and the high-frequency power supply and performing impedance matching between the high-frequency power supply and a load. The impedance matcher includes a variable reactance element changing a reactance.

The controller causes the position adjuster to change the distance between the first electrode and the second electrode in a step by step manner. The controller adjusts a constant of the variable reactance element based on the value corresponding to the reflected power, every time the distance between the first electrode and the second electrode is changed. The controller determines the distance between the first electrode and the second electrode based on a variation of the constant of the variable reactance element before and after the distance between the first electrode and the second electrode has been changed.

In a high-frequency heating apparatus according to a sixth aspect of the present disclosure, in addition to the fifth aspect, the variable reactance element includes one or both of a variable inductor and a variable capacitor.

In a high-frequency heating apparatus according to a seventh aspect of the present disclosure, in addition to the fifth aspect, the controller adjusts the constant of the variable reactance element so that the value corresponding to the reflected power is minimum.

Hereafter, exemplary embodiments of the present disclosure will be described with reference to the appended drawings.

First Exemplary Embodiment

Overall Configuration

FIG. 1 is a schematic view illustrating the configuration of high-frequency heating apparatus 1A according to a first exemplary embodiment of the present disclosure. As illustrated in FIG. 1, high-frequency heating apparatus 1A includes first electrode 11, second electrode 12, heating chamber 13, position adjuster 20, high-frequency power supply 30, impedance matcher 40, detector 50, and controller 60. First electrode 11, second electrode 12, and position adjuster 20 are disposed in heating chamber 13.

First Electrode

First electrode 11 is a flat-shaped electrode having a rectangular shape, which is disposed in an upper part of heating chamber 13.

Second Electrode

Second electrode 12 is a flat-shaped electrode having a rectangular shape. Second electrode 12 is disposed on a bottom surface of heating chamber 13 so as to face first electrode 11. Second electrode 12 is connected to ground. Heating target 90 is placed on second electrode 12 and disposed between first electrode 11 and second electrode 12. Heating target 90 is a dielectric material, such as a food, with a uniform thickness.

Position Adjuster

Position adjuster 20 is disposed on the ceiling of heating chamber 13. Position adjuster 20 adjusts the distance between first electrode 11 and second electrode 12 in response to an instruction from controller 60. In the present exemplary embodiment, position adjuster 20 moves first electrode 11 to thereby adjust the position of first electrode 11.

Position adjuster 20 includes, for example, a motor (not shown) disposed on the ceiling of heating chamber 13, and a connecting member (not shown) connecting the motor to first electrode 11. When this motor rotates, the connecting member causes first electrode 11 to move vertically. The connecting member may be, for example, a rod-shaped member or a wire.

High-Frequency Power Supply

Figure 2:
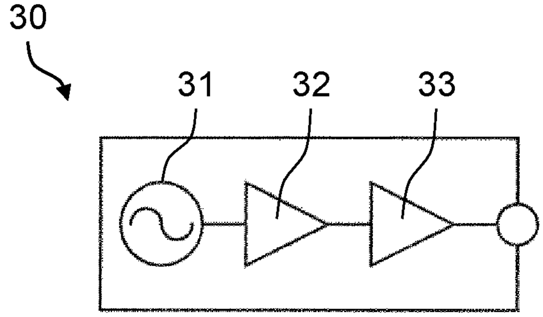
FIG. 2 is a schematic view illustrating the configuration of a high-frequency power supply in the first exemplary embodiment.

High-frequency power supply 30 is connected to first electrode 11 via impedance matcher 40 and detector 50 to supply a high-frequency power to first electrode 11. FIG. 2 is a schematic view illustrating a configuration of high-frequency power supply 30. As illustrated in FIG. 2, high-frequency power supply 30 includes high-frequency oscillator 31, amplifier 32, and amplifier 33.

High-frequency oscillator 31 provides high-frequency signal having a frequency within a HF to VHF band. Amplifier 32 amplifies the high-frequency signal provided by high-frequency oscillator 31. Amplifier 33 further amplifies a voltage signal amplified by amplifier 32. As a result, high-frequency power supply 30 is able to generate a desired high-frequency signal.

High-frequency power supply 30 supplies a high-frequency power to first electrode 11 to thereby generate an electric field between first electrode 11 and second electrode 12. This electric field causes heating target 90, which is disposed between first electrode 11 and second electrode 12, to be dielectrically heated.

Impedance Matcher

As illustrated in FIG. 1, impedance matcher 40 is disposed between first electrode 11 and high-frequency power supply 30. Impedance matcher 40 performs impedance matching between high-frequency power supply 30 and a load inside heating chamber 13. The load inside heating chamber 13 includes first electrode 11, second electrode 12, and heating target 90.

Figure 3A:
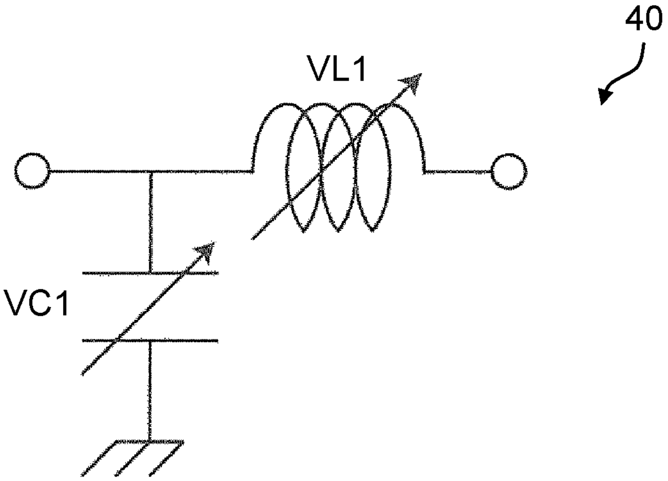
FIG. 3A is a schematic view illustrating one configuration of an impedance matcher in the first exemplary embodiment.

FIG. 3A is a schematic view illustrating a configuration of impedance matcher 40. As illustrated in FIG. 3A, impedance matcher 40 includes variable inductor VL1 and variable capacitor VC1. Variable inductor VL1 is connected to first electrode 11. Variable capacitor VC1 is connected to ground. Accordingly, the capacitor formed by first electrode 11 and second electrode 12 is connected in series to variable inductor VL1 and connected in parallel to variable capacitor VC1.

Impedance matcher 40 includes a motor (not shown) that changes one or both of the inductance of variable inductor VL1 and the capacitance of variable capacitor VC1. By controlling this motor, controller 60 causes impedance matcher 40 to perform impedance matching between high-frequency power supply 30 and the load.

Figure 3B:
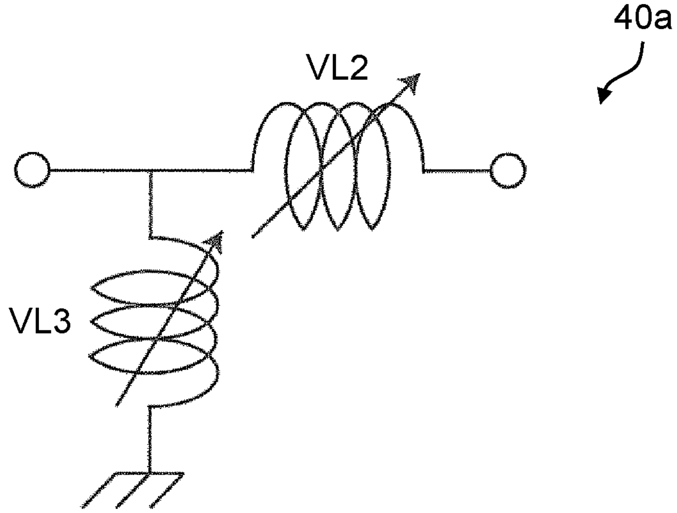
FIG. 3B is a schematic view illustrating another configuration of the impedance matcher in the first exemplary embodiment.

FIG. 3B is a schematic view illustrating a configuration of impedance matcher 40*a*, which is a modified example of impedance matcher 40. As illustrated in FIG. 3B, impedance matcher 40*a* includes variable inductors VL2 and VL3. As for impedance matcher 40*a*, variable inductor VL2 is connected to first electrode 11. Variable inductor VL3 is connected to ground. In other words, the capacitor formed by first electrode 11 and second electrode 12 is connected in series to variable inductor VL2 and connected in parallel to variable inductor VL3.

Impedance matcher 40*a* includes a motor (not shown) that changes one or both of the inductance of variable inductor VL2 and the inductance of variable inductor VL3. By controlling this motor, controller 60 causes impedance matcher 40 to perform impedance matching between high-frequency power supply 30 and the load.

Detector

When the load and high-frequency power supply 30 are not impedance matched, a portion of the electric power is not supplied to heating chamber 13, and is reflected toward high-frequency power supply 30. Detector 50 detects a reflected power from first electrode 11 toward high-frequency power supply 30. Detector 50 may be composed of, for example, an electric circuit.

Figure 4A:
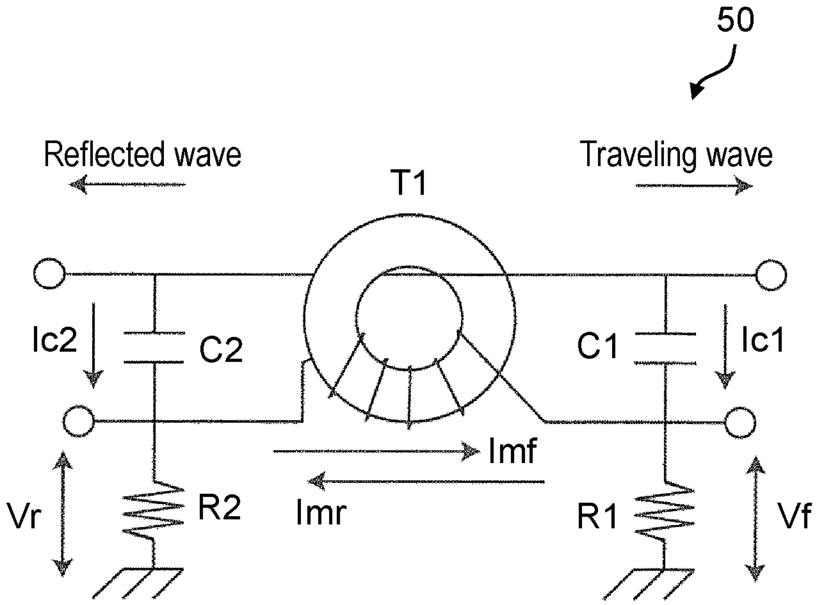
FIG. 4A is a schematic view illustrating one configuration of a detector in the first exemplary embodiment.

FIG. 4A is a schematic view illustrating a configuration of impedance matcher 50. As illustrated in FIG. 4A, in the present exemplary embodiment, detector 50 is a CM directional coupler, in which capacitive coupling (C) and inductive coupling (M) are combined.

Detector 50 includes transformer T1, capacitor C1, capacitor C2, resistor R1, and resistor R2. Capacitors C1 and C2 are disposed on respective sides of transformer T1. Resistors R1 and R2 are connected in series to capacitors C1 and C2, respectively.

In FIG. 4A, it is defined that a traveling wave flows from left to right and a reflected wave flows from right to left. Then, transformer T1 generates current Imf corresponding to the traveling wave and current Imr corresponding to the reflected wave. Capacitors C1 and C2 generate current Ic1 and Ic2, respectively.

Voltage Vf across resistor R1 and voltage Vr across resistor R2 are represented by the following equations.

$$Vf = R1 \times (Ic1 + Imf - Imr)$$

$$Vr = R2 \times (Ic2 + Imr - Imf)$$

When the constants of the components are determined so that Ic1 is equal to Imr and Ic2 is equal to Imf, the circuit shown in FIG. 4A functions as a directional coupler. Detector 50 may be formed by a distributed constant line arranged on a circuit board pattern.

Figure 4B:
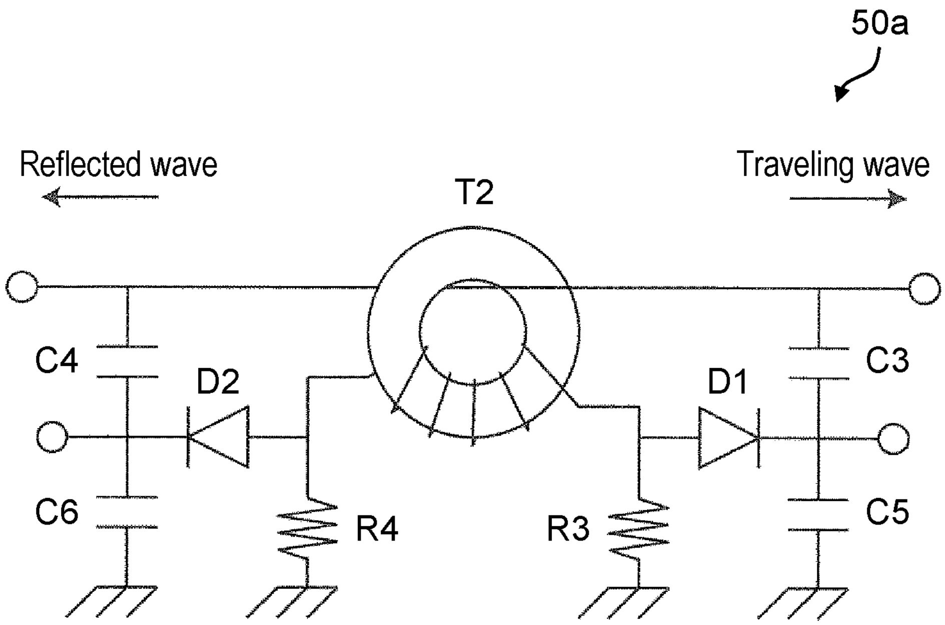
FIG. 4B is a schematic view illustrating another configuration of the detector in the first exemplary embodiment.

FIG. 4B is a schematic view illustrating a configuration of detector 50*a*, which is a modified example of detector 50. As illustrated in FIG. 4B, detector 50*a* includes transformer T2, capacitor C3, capacitor C4, capacitor C5, capacitor C6, resistor R3, resistor R4, diode D1, and diode D2.

With the above-described configurations, detectors 50 and 50*a* are able to detect both of the reflected wave (reflected power) and the traveling wave (incident power).

Controller

Controller 60 may be composed of, for example, a microcomputer. As illustrated in FIG. 1, controller 60 causes position adjuster 20 to adjust the position (i.e., the height) of first electrode 11 so that heating target 90 can be heated efficiently.

Controller 60 is electrically connected to position adjuster 20 and detector 50. Controller 60 receives a value of reflected power from detector 50. Controller 60 transmits a moving direction and a moving amount of first electrode 11 to position adjuster 20.

Controller 60 acquires the value of reflected power from detector 50 while moving first electrode 11 by controlling position adjuster 20. Controller 60 calculates a reflection rate, which is a rate of the reflected wave (reflected power) and the traveling wave (incident power). Controller 60 causes position adjuster 20 to stop first electrode 11 at a position at which the reflection rate is less than or equal to a threshold value.

An Example of Operation

Figure 5:
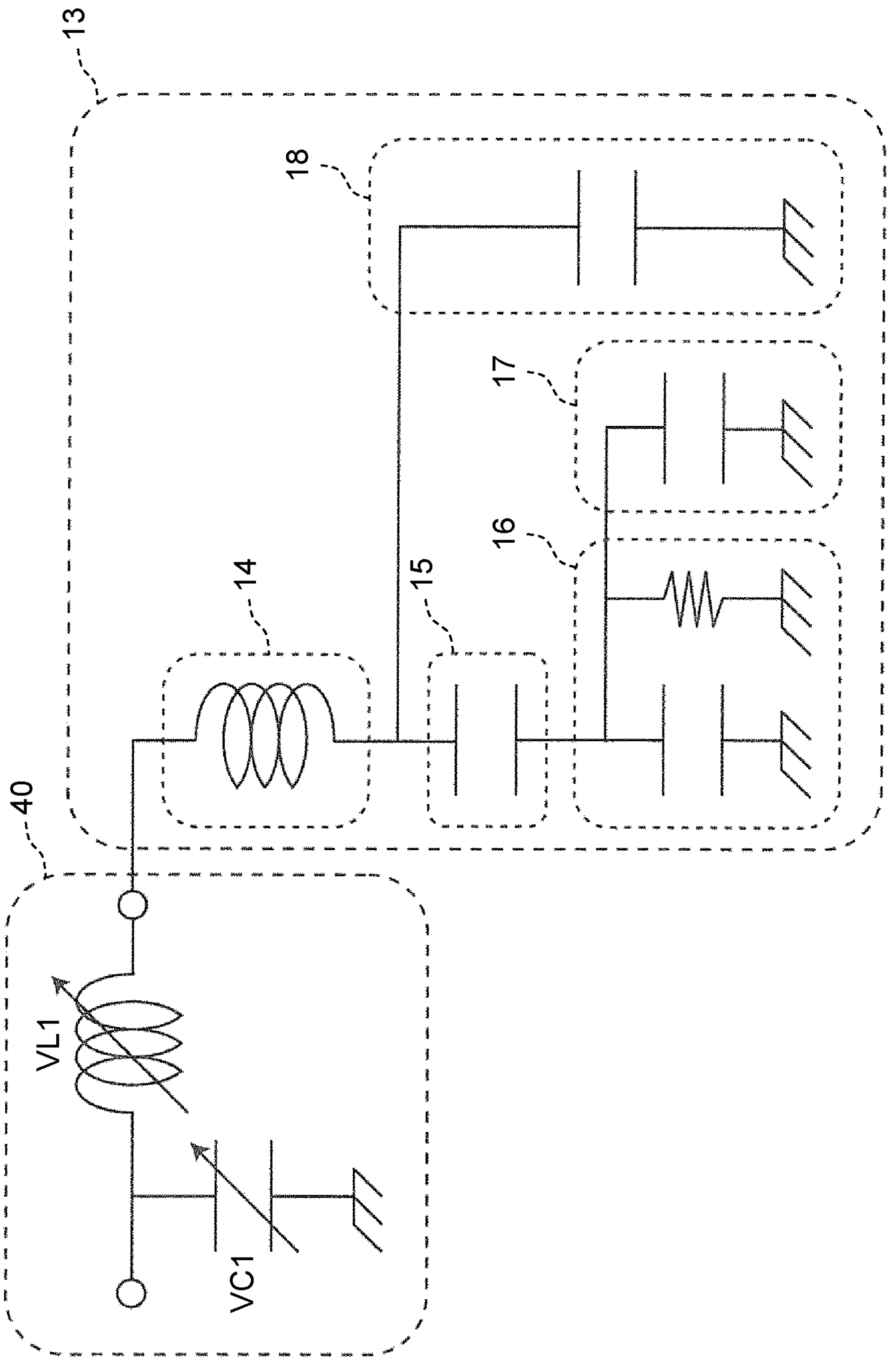
FIG. 5 is a schematic view illustrating an equivalent circuit related to the impedance matcher and the inside of a heating chamber in Example 1 of the first exemplary embodiment.

Example 1, which is an example of the operations of high-frequency heating apparatus 1A, is described below. FIG. 5 shows an equivalent circuit related to impedance matcher 40 and the inside of a heating chamber 13 of Example 1.

The reflection rate refers to the proportion of reflected wave to traveling wave. The traveling wave is an incident power that is applied to first electrode 11 by high-frequency power supply 30, and the reflected wave is a reflected power that comes back from first electrode 11 to high-frequency power supply 30. In Example 1, the incident power is 1 W.

In Example 1, the traveling wave and the reflected wave were detected while bringing first electrode 11 close to heating target 90 to calculate the reflection rate. In Example 1, after position adjuster 20 moves first electrode 11, impedance matcher 40 performs impedance matching. In other words, impedance matching is not carried out while position adjuster 20 is operating.

In Example 1, minced beef was used as heating target 90. In Example 1, the reflection rate was calculated under condition 1, in which 1 kg of minced beef was placed, and condition 2, in which 300 g of minced beef was placed. In condition 1, the dimensions of heating target 90 was 165 mm×110 mm×25 mm. In condition 2, the dimensions of heating target 90 was 220 mm×155 mm×40 mm.

As illustrated in FIG. 5, in Example 1, the equivalent circuit of the inside of heating chamber 13 include inductance 14, capacitance 15 between first electrode 11 and heating target 90, capacitance-resistance 16 inside heating target 90, capacitance 17 in the periphery of heating target 90, and capacitance 18 between first electrode 11 and an inner wall surface of heating chamber 13. Inductance 14 is the wire inductance from impedance matcher 40 to first electrode 11 including position adjuster 20.

Impedance matcher 40 includes variable inductor VL1 and variable capacitor VC1. Variable inductor VL1 is connected to first electrode 11, and variable capacitor VC1 is connected to ground. Accordingly, the capacitor formed by first electrode 11 and second electrode 12 is connected in series to variable inductor VL1 and connected in parallel to variable capacitor VC1.

Figure 6:
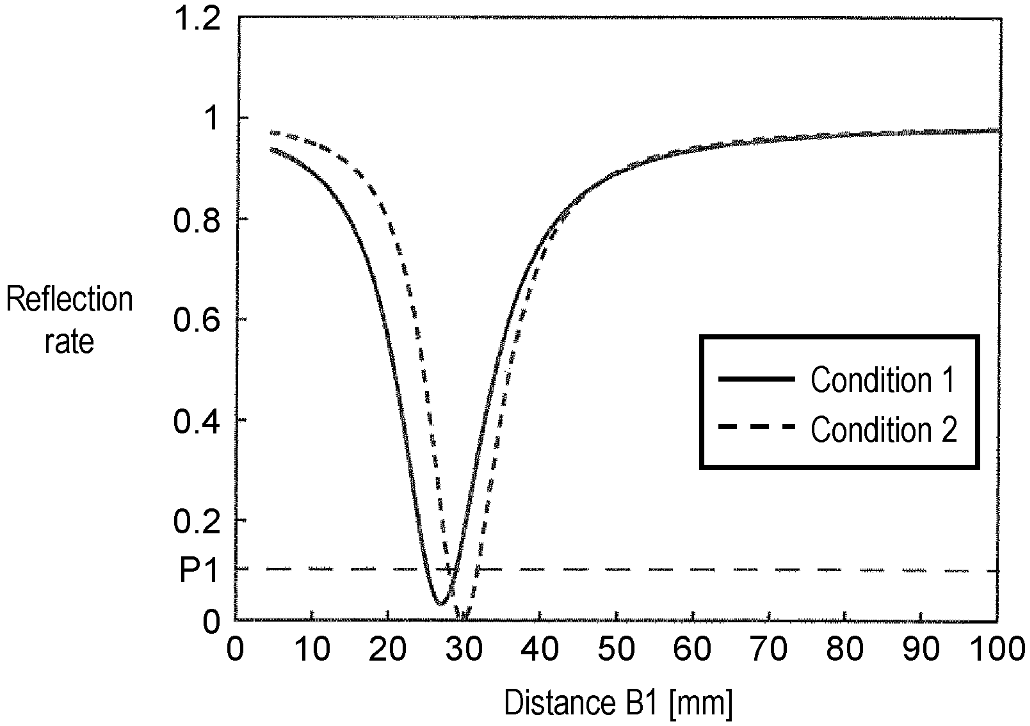
FIG. 6 is a graph showing the relationship between the reflection rate and the distance between the first electrode and a heating target in Example 1.

FIG. 6 is a graph showing the relationship between the reflection rate and distance B1 (see FIG. 1) between first electrode 11 and heating target 90 in Example 1. As illustrated in FIG. 6, in Example 1, when first electrode 11 is moved toward heating target 90 under conditions 1 and 2, the reflection rate is the smallest at distance B1 of 28 mm and 30 mm, respectively.

The smallest reflection rate means that the reflected wave is the least. At this point, first electrode 11 is disposed at a desirable position for an efficient heating process. Therefore, in Example 1, controller 60 causes position adjuster 20 to move first electrode 11 toward heating target 90 and then stop first electrode 11 when the reflection rate becomes less than or equal to predetermined threshold value P1.

In this way, controller 60 causes first electrode 11 to be disposed at a desirable position for performing an efficient heating process according to the dimensions of heating target 90. Threshold value P1 is a value of reflection rate that is permissible for the efficient heating process. In cases where heating target 90 is placed between first electrode 11 and second electrode 12, heating target 90 can be heated efficiently when the reflection rate is less than or equal to threshold value P1.

Thus, controller 60 causes position adjuster 20 to adjust the position of first electrode 11 so that heating target 90 can be heated efficiently.

In Example 1, threshold value P1 is set to 0.1, for example. Accordingly, under conditions 1 and 2, controller 60 causes position adjuster 20 to move first electrode 11 so that distance B1 falls into the range of 25 mm to 29 mm and the range of 28 mm to 32 mm, respectively.

Next, the following describes a determination in Example 1 as to whether or not heating target 90 is placed between first electrode 11 and second electrode 12.

Figure 7:
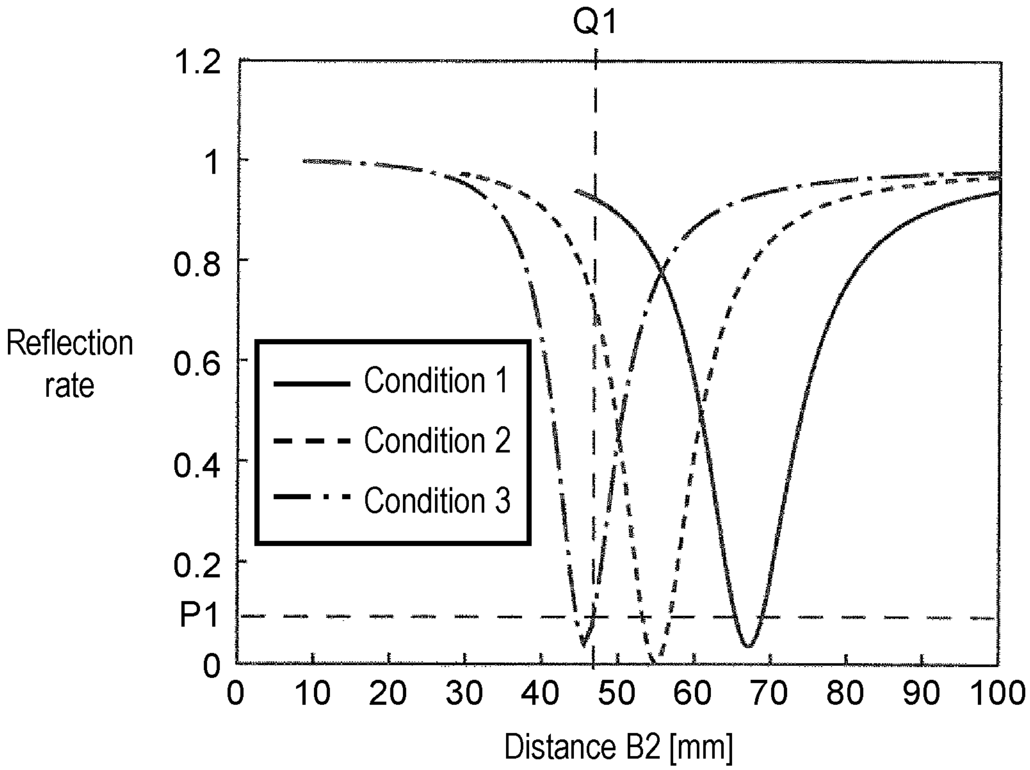
FIG. 7 is a graph showing the relationship between the reflection rate and the distance between the first electrode and the second electrode in Example 1.

FIG. 7 is a graph showing the relationship between the reflection rate and distance B2 (see FIG. 1) between first electrode 11 and second electrode 12 in Example 1. In the example shown in FIG. 7, the reflection rate is calculated while varying distance B2 under conditions 1 and 2 and additional condition 3. In condition 3, heating target 90 is not placed.

As illustrated in FIG. 7, under condition 3, the reflection rate is the smallest when distance B2 is 45 mm. Under conditions 1 and 2, the reflection rate is the smallest when distance B2 is 68 mm and 55 mm, respectively.

In Example 1, distance B2 at which the reflection rate reaches threshold value P1 under condition 3 is defined as predetermined threshold value Q1. Position adjuster 20 gradually narrows distance B2. When the reflection rate does not lower to less than or equal to threshold value P1 before distance B2 reaches threshold value Q1, controller 60 determines that heating target 90 is not placed between first electrode 11 and second electrode 12.

The relative dielectric constant of heating target 90 is greater than 1. Therefore, when heating target 90 is not placed, capacitance-resistance 16 (see FIG. 5) inside heating target 90 is the smallest. As a result, distance B2 at which the reflection rate is at the minimum is the smallest heating target 90 is not placed.

By making use of this, high-frequency heating apparatus 1A determines that heating target 90 is not placed between first electrode 11 and second electrode 12 in the present exemplary embodiment.

Here, the determination of threshold value Q1 is described. Controller 60 acquires the information of the reflection rate in cases where heating target 90 is not placed (i.e., the information of the reflection rate under condition 3 shown in FIG. 7). More specifically, controller 60 varies distance B2 under the condition where heating target 90 is not placed and acquires the information of the reflection rate.

In this way, controller 60 identifies distance B2 at which the smallest reflection rate is obtained when heating target 90 is not placed. Controller 60 sets threshold value Q1 to be distance B2 at which the reflection rate reaches threshold value P1 for the first time while narrowing distance B2.

Next, the following describes a determination as to whether or not heating target 90 is placed between first electrode 11 and second electrode 12.

Position adjuster 20 gradually narrows distance B2. While distance B2 is being narrowed, detector 50 detects the reflected wave (reflected power) and the traveling wave (incident power). Controller 60 receives the information of the reflected wave and the traveling wave and calculates a reflection rate based on the received information.

If the reflection rate does not lower to less than or equal to threshold value P1 before distance B2 reaches threshold value Q1, controller 60 determines that heating target 90 is not placed between first electrode 11 and second electrode 12.

In other words, when the reflection rate is greater than threshold value P1 before distance B2 reaches threshold value Q1, controller 60 determines that heating target 90 is not placed between first electrode 11 and second electrode 12. In the present exemplary embodiment, threshold values P1 and Q1 correspond to the first threshold value and the second threshold value, respectively.

On the other hand, when the reflection lowers to less than or equal to threshold value P1 before distance B2 reaches threshold value Q1, controller 60 determines that heating target 90 is placed between first electrode 11 and second electrode 12.

Another Example of Operation

Figure 8:
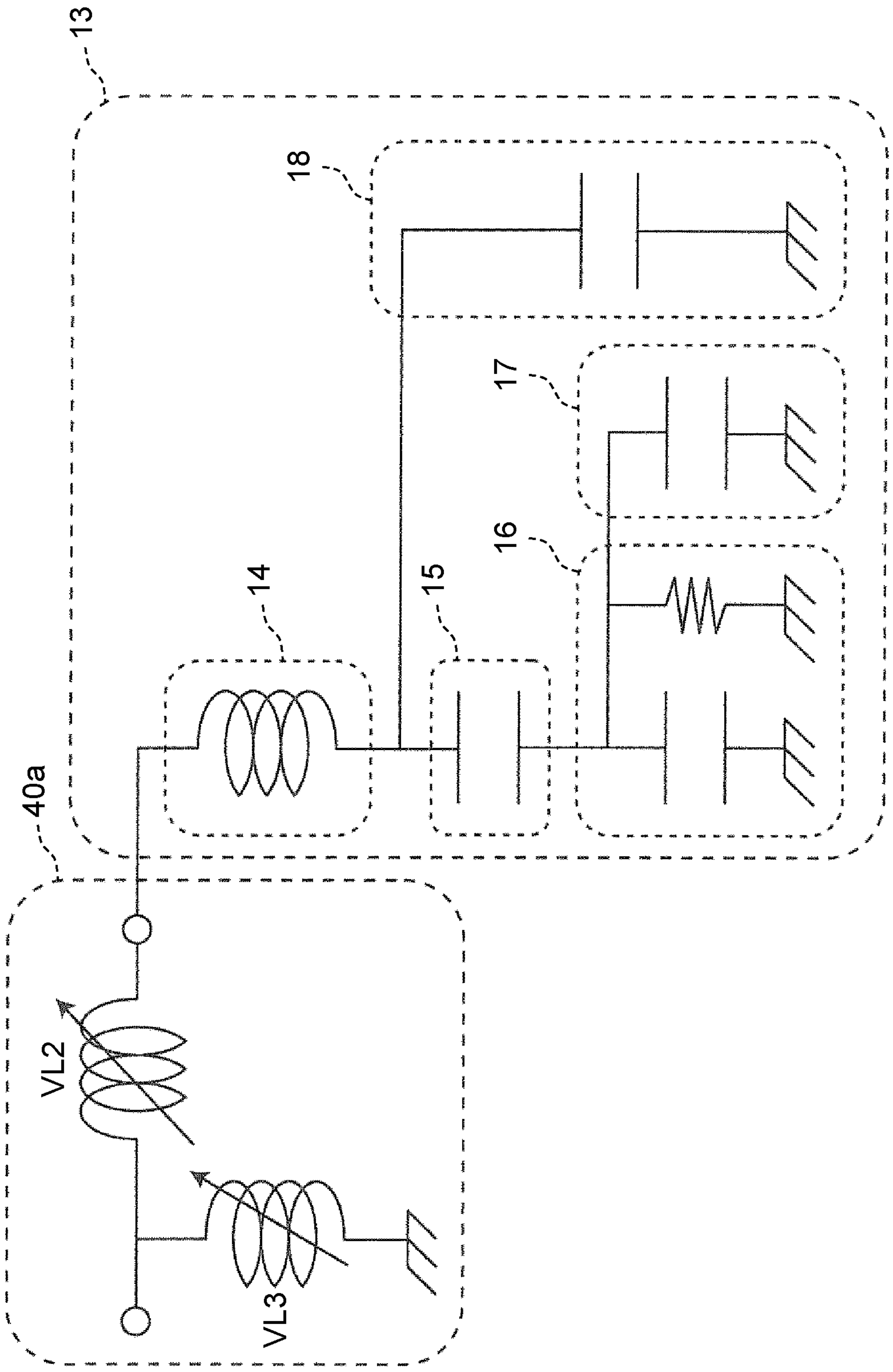
FIG. 8 is a schematic view illustrating an equivalent circuit related to the impedance matcher and the inside of a heating chamber in Example 2 of the first exemplary embodiment.

Example 2, which is another example of the operations of high-frequency heating apparatus 1A, is described below. FIG. 8 shows an equivalent circuit related to impedance matcher 40*a* and the inside of a heating chamber 13 of Example 2. The equivalent circuit of the inside of heating chamber 13 shown in FIG. 8 is the same as that of Example 1 shown in FIG. 5, and therefore, the detailed description will not be repeated.

As illustrated in FIG. 8, in Example 2, impedance matcher 40*a*, which is a modified example of impedance matcher 40, includes variable inductors VL2 and VL3. Variable inductor VL2 is connected to first electrode 11, and variable inductor VL3 is connected to ground. Accordingly, the capacitor formed by first electrode 11 and second electrode 12 is connected in series to variable inductor VL2 and connected in parallel to variable inductor VL3.

In Example 2, the traveling wave and the reflected wave were detected while bringing first electrode 11 close to heating target 90 to calculate the reflection rate. In Example 2, after position adjuster 20 moves first electrode 11, impedance matcher 40*a* performs impedance matching. In other words, impedance matching is not carried out while position adjuster 20 is operating.

In Example 2, minced beef was used as heating target 90. In Example 2, the reflection rate was calculated under condition 4, in which 1 kg of minced beef was placed, and condition 5, in which 300 g of minced beef was placed. In condition 4, the dimensions of heating target 90 was 165 mm×110 mm×25 mm. In condition 5, the dimensions of heating target 90 was 220 mm×155 mm×40 mm.

Figure 9:
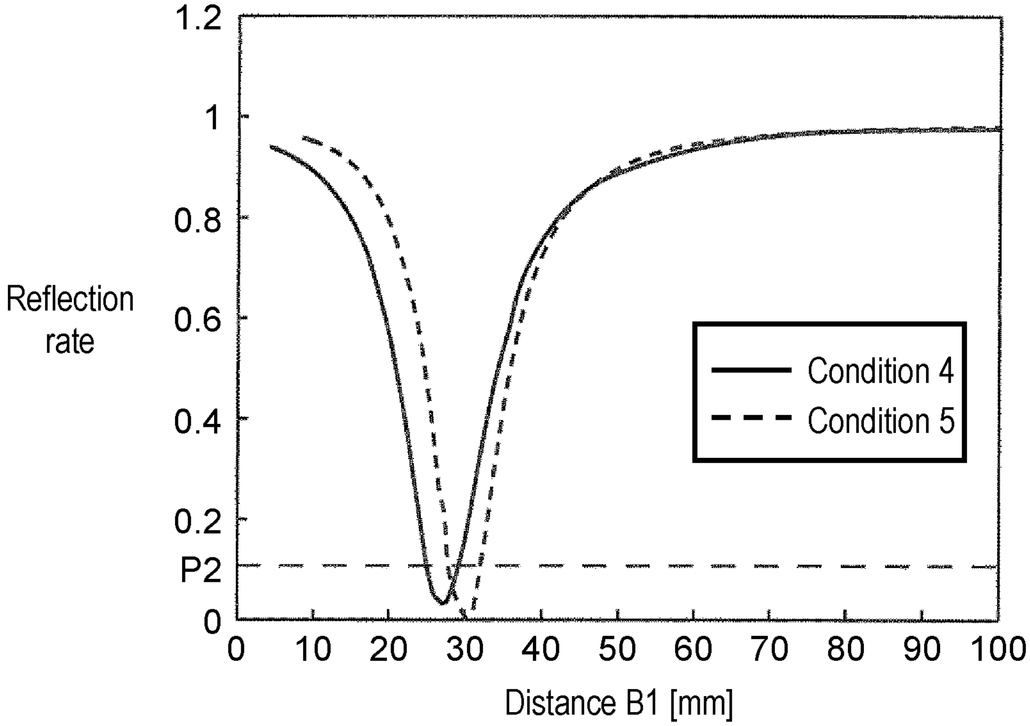
FIG. 9 is a graph showing the relationship between the reflection rate and the distance between the first electrode and the heating target in Example 2.

FIG. 9 shows the relationship between the reflection rate and distance B1 between first electrode 11 and heating target 90 in Example 2. As illustrated in FIG. 9, in Example 2, when first electrode 11 is moved toward heating target 90 under conditions 4 and 5, the reflection rate is the smallest at distance B1 of 27 mm and 30 mm, respectively.

In Example 2, controller 60 causes position adjuster 20 to move first electrode 11 toward heating target 90 so that the reflection rate detected by detector 50 becomes less than or equal to predetermined threshold value P2. In this way, controller 60 causes first electrode 11 to be placed at a position at which heating target 90 can be heated efficiently.

In Example 2, threshold value P2 is set to 0.1, for example. Accordingly, under conditions 4 and 5, controller 60 causes first electrode 11 to move so that distance B1 falls into the range of 25 mm to 29 mm and the range of 28 mm to 32 mm, respectively.

Figure 10:
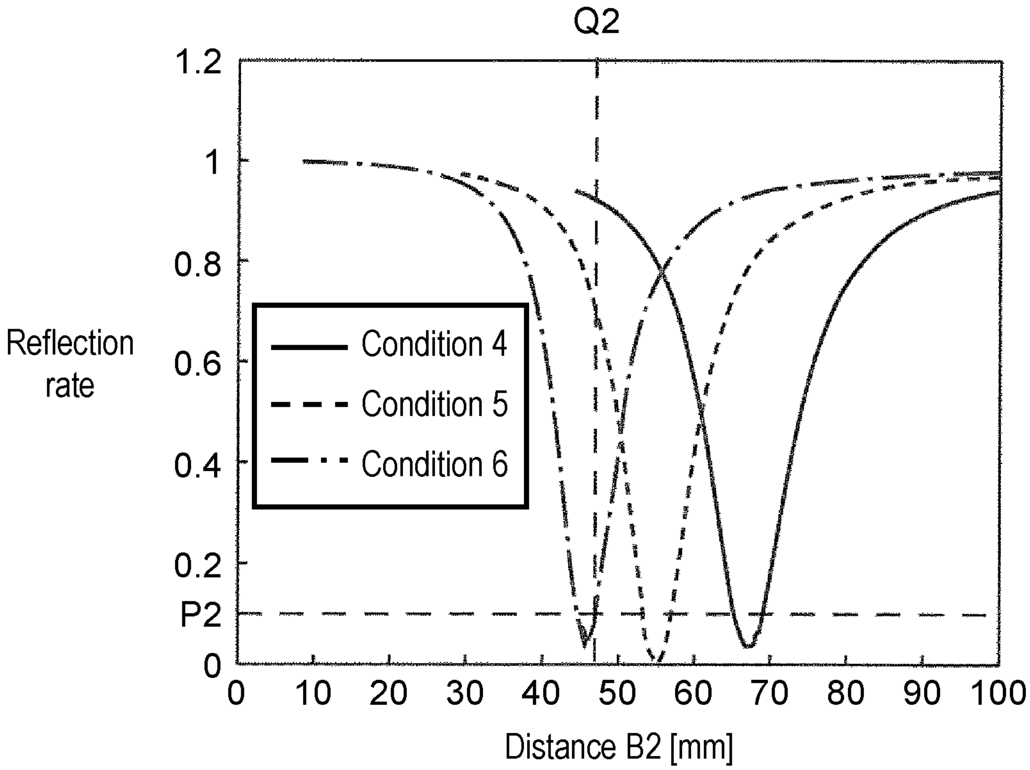
FIG. 10 is a graph showing the relationship between the reflection rate and the distance between the first electrode and the second electrode in Example 2.

FIG. 10 shows the relationship between the reflection rate and distance B2 between first electrode 11 and second electrode 12 in Example 2. In the example shown in FIG. 10, the reflection rate is calculated while varying distance B2 under conditions 4 and 5 and additional condition 6. In condition 6, heating target 90 is not placed.

As illustrated in FIG. 10, under condition 6, the reflection rate is the smallest when distance B2 is 45 mm. Under conditions 4 and 5, the reflection rate is the smallest when distance B2 is 68 mm and 55 mm, respectively.

In Example 2, distance B2 at which the reflection rate reaches threshold value P2 under condition 6 is defined as predetermined threshold value Q2. Position adjuster 20 gradually narrows distance B2. When the reflection rate does not lower to less than or equal to threshold value P2 before distance B2 reaches threshold value Q2, controller 60 determines that heating target 90 is not placed between first electrode 11 and second electrode 12.

On the other hand, when the reflection lowers to less than or equal to threshold value P2 before distance B2 reaches threshold value Q2, controller 60 determines that heating target 90 is placed between first electrode 11 and second electrode 12.

Advantageous Effects

High-frequency heating apparatus 1A includes detector 50 that detects reflected power, position adjuster 20 that moves first electrode 11, and controller 60. Controller 60 controls position adjuster 20 based on the reflection rate, which is the proportion of reflected power to incident power, for adjusting the position of first electrode 11. The present exemplary embodiment makes it possible to adjust the position of first electrode 11 easily according to the dimensions of heating target 90. As a result, heating target 90 can be heated efficiently.

Controller 60 causes first electrode 11 to be disposed at a position that is desirable for efficient heating based on the reflection rate. Therefore, it is possible to adjust the position of first electrode 11 without causing first electrode 11 to make contact with heating target 90.

High-frequency heating apparatus 1A does not require a sensor for detecting contact between first electrode 11 and heating target 90. Moreover, high-frequency heating apparatus 1A does not require a mechanism that limits the load acting on heating target 90 when first electrode 11 comes into contact with heating target 90. The present exemplary embodiment is able to simplify position adjuster 20 and consequently simplify the apparatus as a whole.

In the present exemplary embodiment, after the position of first electrode 11 has been adjusted, impedance matcher 40 performs impedance matching between heating chamber 13 and high-frequency power supply 30. This makes it possible to start adjusting the constant of the variable reactance element in impedance matcher 40 from the condition where the reflected power is small. Therefore, it is possible to use a variable reactance element with a narrower variable range. As a result, impedance matching can be carried out in a shorter time.

The present exemplary embodiment illustrates that first electrode 11 is a flat-plate-shaped electrode having a rectangular shape. However, first electrode 11 may have other shapes, such as a circular shape, an elliptic shape, or a polygonal shape.

In the first exemplary embodiment, second electrode 12 is disposed below first electrode 11. However, the present disclosure is not limited to this. It is desirable that first electrode 11 and second electrode 12 be disposed facing each other. For example, second electrode 12 may be disposed above first electrode 11. It is also possible that first electrode 11 and second electrode 12 may be disposed facing each other along a side-to-side axis.

The present exemplary embodiment illustrates that first electrode 11, second electrode 12, and position adjuster 20 are disposed in heating chamber 13. However, the present disclosure is not limited to this. It is also possible that position adjuster 20 may be disposed outside heating chamber 13.

The present exemplary embodiment illustrates that position adjuster 20 moves first electrode 11 vertically. However, the present disclosure is not limited to this. It is also possible that position adjuster 20 may move second electrode 12 vertically. Position adjuster 20 may move both first electrode 11 and second electrode 12 vertically.

The present exemplary embodiment illustrates that high-frequency power supply 30 includes high-frequency oscillator 31 and amplifiers 32 and 33, as illustrated in FIG. 2. However, high-frequency power supply 30 is not limited to the present exemplary embodiment, as long as high-frequency power supply 30 is able to output a high-frequency power.

The present exemplary embodiment illustrates that high-frequency heating apparatus 1A includes impedance matcher 40. However, high-frequency heating apparatus 1A may not be provided with impedance matcher 40.

The present exemplary embodiment illustrates that controller 60 controls position adjuster 20 based on a reflection rate. However, controller 60 may control position adjuster 20 based on a value of the reflected power. In this case, controller 60 causes position adjuster 20 to stop first electrode 11 when the value of reflected power falls below a predetermined threshold value.

That is, it is desirable that controller 60 control position adjuster 20 based on a value corresponding to the reflected power, such as the reflection rate and the value of the reflected power.

The present exemplary embodiment illustrates that threshold values P1 and P2 are set to 0.1. However, the present disclosure is not limited to these. Threshold values P1 and P2 may be set to any value.

In the present exemplary embodiment, impedance matcher 40 shown in FIG. 3A and impedance matcher 40*a* shown in FIG. 3B are shown to describe examples of the configuration of impedance matcher. However, the present disclosure is not limited to this. It is sufficient that the impedance matcher includes a variable reactance element and the impedance matcher is able to perform impedance matching between the impedance of high-frequency power supply 30 and the impedance of the load inside heating chamber 13.

In the present exemplary embodiment, it is assumed that the dielectric constant of heating target 90 is invariable. In cases where the dielectric constant of heating target 90 changes as the heating progresses, it is possible that the position of first electrode 11 may be adjusted again based of the reflection rate.

Second Exemplary Embodiment

High-frequency heating apparatus 1B according to a second exemplary embodiment of the present disclosure will be described. High-frequency heating apparatus 1B has the same configuration as high-frequency heating apparatus 1A of the first exemplary embodiment. The present exemplary embodiment differs from the first exemplary embodiment in that controller 60 causes impedance matcher 40 and position adjuster 20 to operate alternately.

Figure 11:
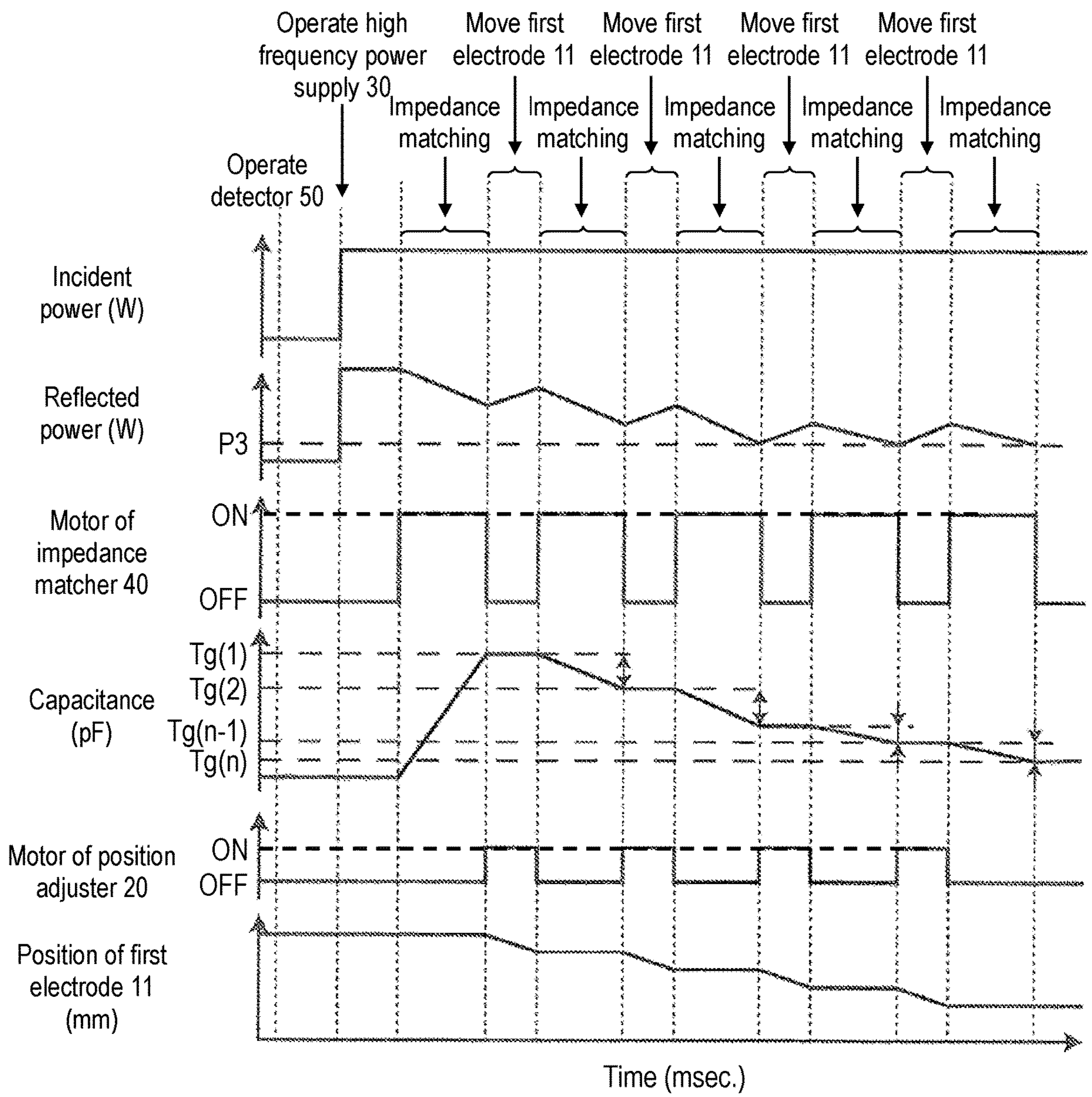
FIG. 11 is a timing chart illustrating operations of a high-frequency heating apparatus according to a second exemplary embodiment of the present disclosure.

FIG. 11 is a timing chart illustrating operations of high-frequency heating apparatus 1B. As illustrated in FIG. 11, high-frequency heating apparatus 1B causes a motor included in impedance matcher 40 and a motor included in position adjuster 20 to operate alternately, to thereby perform moving of first electrode 11 and impedance matching alternately.

In the present exemplary embodiment, controller 60 causes position adjuster 20 to move first electrode 11 from the position that is farthest away from heating target 90 closer toward heating target 90 in a step by step manner. At each of the stop positions of first electrode 11, controller 60 causes impedance matcher 40 to perform impedance matching based on a value of the reflected power.

In the present exemplary embodiment, controller 60 causes impedance matcher 40 to perform impedance matching based on a value of the reflected power. As illustrated in FIG. 11, the input power is constant in the present exemplary embodiment. Therefore, it means substantially the same as that controller 60 performs impedance matching based on the reflection rate.

In the present exemplary embodiment, impedance matcher 40 includes a variable reactance element that changes a reactance. The variable reactance element includes one or both of a variable inductor and a variable capacitor.

Controller 60 determines the position of first electrode 11 when the constant of the variable reactance element of impedance matcher 40 lowers to less than or equal to a predetermined threshold value.

High-frequency heating apparatus 1B includes impedance matcher 40 shown in FIG. 3A. However, high-frequency heating apparatus 1B may include impedance matcher 40*a* shown in FIG. 3B.

In order to cause impedance matcher 40 to perform impedance matching, controller 60 changes the constant of the variable reactance element included in impedance matcher 40 based on the value of the reflected power. The constant of the variable reactance element may be the inductance of a variable inductance element and the capacitance of a variable reactance element. As illustrated in FIG. 3A, the variable inductance element is variable inductor VL1, and the variable capacitance element is variable capacitor VC1.

In the present exemplary embodiment, the constant of the variable reactance element is adjusted by fixing the inductance of variable inductor VL1 and varying the capacitance of variable capacitor VC1.

Controller 60 adjusts the capacitance of variable capacitor VC1 of impedance matcher 40 so that the value of the reflected power is minimized at the initial position of first electrode 11 after high-frequency power supply 30 has started to operate. Controller 60 memorizes the constant of variable capacitor VC1 at which the smallest reflected power is obtained as Tg(1).

More specifically, controller 60 adjusts the constant of variable capacitor VC1 so that the value of the reflected power is brought closer to predetermined threshold value P3. In a condition where first electrode 11 is at a position away from heating target 90, the reflected power may not be reduced. FIG. 11 shows that when “impedance matching” and “moving of first electrode 11” have been performed three cycles, the reflected power is close to threshold value P3.

Controller 60 fixes the constant of variable capacitor VC1 to Tg(1), and causes position adjuster 20 to move first electrode 11 by a predetermined distance. When first electrode 11 moves, the impedance of the load inside heating chamber 13 changes, increasing the reflected power.

Again, controller 60 adjusts the capacitance of variable capacitor VC1 so that the reflected power is minimized. Controller 60 memorizes the capacitance of variable capacitor VC1 at which the smallest reflected power is obtained as Tg(2).

Thus, controller 60 repeats moving of first electrode 11 and impedance matching n times, and records the capacitance of variable capacitor VC1 at which the smallest reflected power is obtained as Tg(1) to Tg(n).

When the distance B1 is larger, the variation of capacitance of variable capacitor VC1 is greater before and after the moving of first electrode 11. On the other hand, as the distance B1 is closer to a desirable value, the variation of capacitance of variable capacitor VC1 is smaller.

In the present exemplary embodiment, controller 60 determines distance B2 based on the change of the capacitance of variable capacitor VC1 before and after the moving of first electrode 11. More specifically, controller 60 acquires constant Tg(n−1) immediately before the completion of adjustment of variable capacitor VC1 and constant Tg(n) after completion of adjustment of variable capacitor VC1, and calculates the variation [Tg(n−1)−Tg(n)].

Controller 60 has a predetermined reference value that is the threshold value for the capacitance variation [Tg(n−1)−Tg(n)] of variable capacitor VC1. Controller 60 causes first electrode 11 to be positioned so that the capacitance variation [Tg(n−1)−Tg(n)] of variable capacitor VC1 falls below the reference value. This makes it possible to determine distance B2 that is suitable for heating.

Advantageous Effects

In the present exemplary embodiment, controller 60 causes position adjuster 20 to bring first electrode 11 closer toward heating target 90 in a step by step manner. At each of the stop positions of first electrode 11, controller 60 causes impedance matcher 40 to perform impedance matching based on a value of the reflected power. Controller 60 causes first electrode 11 to move so that the variation of the constant of the variable reactance element becomes less than or equal to a reference value. Thus, it is possible to easily position first electrode 11 at a desirable position according to the dimensions of heating target 90. As a result, heating target 90 can be heated efficiently.

The present exemplary embodiment illustrates that the position of first electrode 11 is determined by varying the capacitance of variable capacitor VC1 while fixing the inductance of variable inductor VL1. However, the present disclosure is not limited to this. The position of first electrode 11 may be determined by varying the inductance of variable inductor VL1 while fixing the capacitance of variable capacitor VC1. It is also possible that the position of first electrode 11 may be determined by varying both of the constants of variable inductor VL1 and variable capacitor VC1.

The present exemplary embodiment illustrates that impedance matcher 40 includes variable inductor VL1 connected in series to the capacitor formed by first electrode 11 and second electrode 12, and variable capacitor VC1 connected in parallel to the capacitor formed by first electrode 11 and second electrode 12. However, the present disclosure is not limited to this. It is sufficient that impedance matcher 40 includes a variable reactance element and impedance matcher 40 is able to perform impedance matching between the impedance of high-frequency power supply 30 and the impedance of the load inside heating chamber 13.

The present exemplary embodiment illustrates that controller 60 memorizes the constant of the variable reactance element (i.e., the capacitance of variable capacitor VC1) of impedance matcher 40 at which the smallest reflected power is obtained at the initial position of first electrode 11, as Tg(1). However, the present disclosure is not limited to this.

For example, it is possible that the reflected power may not be sufficiently reduced in a variation range of the variable reactance element, such as in the case where the initial position of first electrode 11 is too far away from heating target 90. In that case, first, by adjusting the constant of the variable reactance element, first electrode 11 is moved to a position at which the reflected power can be reduced. Thereafter, Tg(1) may be determined by adjusting the constant of the variable reactance element.

The present exemplary embodiment illustrates that controller 60 adjusts the constant of the variable reactance element of impedance matcher 40 so that the reflected power is minimized. However, the present disclosure is not limited to this. For example, controller 60 may determine Tg(n) to be the constant of the variable reactance element at which the value of the reflected power is almost the smallest. In this case, it is necessary to adjust threshold value P3.

The present exemplary embodiment illustrates that controller 60 causes first electrode 11 to move so that the variation of the constant of the variable reactance element becomes less than or equal to a reference value. However, the present disclosure is not limited to this. It is also possible that controller 60 may cause first electrode 11 to move based on the constant of the variable reactance element.

The present exemplary embodiment illustrates that position adjuster 20 moves first electrode 11, as in the first exemplary embodiment. However, the present disclosure is not limited to this. For example, position adjuster 20 may move one or both of first electrode 11 and second electrode 12.

INDUSTRIAL APPLICABILITY

The high-frequency heating apparatus according to the present disclosure is applicable to cooking appliances, such as defrosters.

REFERENCE MARKS IN THE DRAWINGS

1A, 1B high-frequency heating apparatus
11 first electrode
12 second electrode
13 heating chamber
14 inductance
15, 17, 18 capacitance
16 capacitance-resistance
20 position adjuster
30 high-frequency power supply
31 high-frequency oscillator
32, 33 amplifier
40, 40*a* impedance matcher
50, 50*a* detector
60 controller
90 heating target

The invention claimed is:

1. A high-frequency heating apparatus comprising:
a first electrode;
a second electrode disposed facing the first electrode;
a high-frequency power supply configured to supply a high-frequency power to the first electrode;
a position adjuster configured to adjust a distance between the first electrode and the second electrode;
a detector detecting a reflected power from the first electrode toward the high-frequency power supply and an incident power from the high-frequency power supply towards the first electrode; and
a controller configured to control the position adjuster based on the reflected power and the incident power,
wherein the position adjuster moves one or both of the first electrode and the second electrode, and
wherein the controller is further configured to:
cause the position adjuster to adjust the distance between the first electrode and the second electrode;
determine the adjusted distance based on a change of capacitance before and after the distance between the first electrode and the second electrode is adjusted;
acquire values of the reflected power and the incident power from the detector at the adjusted distance;
calculate a reflection rate based on the values of the reflected power and the incident power;
determine that a heating target is not placed between the first electrode and the second electrode, when both the calculated reflection rate is greater than a first threshold value and the adjusted distance between the first electrode and the second electrode is equal to or less than a predetermined second threshold value; and
determine that the heating target is placed between the first electrode and the second electrode, when both the calculated reflection rate is less than or equal to the first threshold value and the adjusted distance between the first electrode and the second electrode is greater than the second threshold value.

2. The high-frequency heating apparatus according to claim 1, further comprising:
an impedance matcher disposed between the first electrode and the high-frequency power supply, wherein the controller is further configured to cause the impedance matcher to perform impedance matching between the high-frequency power supply and a load after having adjusted the distance between the first electrode and the second electrode.

3. The high-frequency heating apparatus according to claim 1, wherein the controller is further configured to stop the position adjuster when the reflection rate is less than or equal to the first threshold value.

4. The high-frequency heating apparatus according to claim 1, wherein the reflection rate is a proportion of the reflected power to the high-frequency power that is applied to the first electrode by the high-frequency power supply, the first threshold value is a value of the reflection rate that is permissible for an efficient heating process, and the second threshold value is the distance between the first electrode and the second electrode at which the reflection rate first reaches the first threshold value while narrowing the distance between the first electrode and the second electrode.

* * * * *